US011899341B2

United States Patent
Kondo et al.

(10) Patent No.: US 11,899,341 B2
(45) Date of Patent: Feb. 13, 2024

(54) LENS BARREL AND EXTERIOR HOUSING

(71) Applicant: FUJIFILM Corporation, Tokyo (JP)

(72) Inventors: Nobuyuki Kondo, Saitama (JP); Kazuyoshi Azegami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 398 days.

(21) Appl. No.: 17/238,648

(22) Filed: Apr. 23, 2021

(65) Prior Publication Data
US 2021/0240057 A1  Aug. 5, 2021

Related U.S. Application Data

(63) Continuation of application No. PCT/JP2019/042859, filed on Oct. 31, 2019.

(30) Foreign Application Priority Data

Nov. 12, 2018  (JP) .................. 2018-212187

(51) Int. Cl.
G03B 17/14  (2021.01)
G02B 7/02  (2021.01)

(52) U.S. Cl.
CPC ............. *G03B 17/14* (2013.01); *G02B 7/021* (2013.01); *G02B 7/022* (2013.01)

(58) Field of Classification Search
None
See application file for complete search history.

(56) References Cited

U.S. PATENT DOCUMENTS

| 9,607,791 B2 * | 3/2017 | Chou | H01H 15/10 |
| 2007/0074966 A1 | 4/2007 | Yamamoto et al. | |
| 2016/0131961 A1 * | 5/2016 | Ito | G03B 11/045 396/529 |

FOREIGN PATENT DOCUMENTS

| CN | 1929062 A | 3/2007 |
| CN | 204681531 U | 9/2015 |
| CN | 205452073 U | 8/2016 |
| CN | 206620111 U | 11/2017 |

(Continued)

OTHER PUBLICATIONS

International Preliminary Report on Patentability issued in PCT/JP2019/042859; completed Nov. 16, 2020.
(Continued)

*Primary Examiner* — Rodney E Fuller
(74) *Attorney, Agent, or Firm* — Studebaker & Brackett PC

(57) ABSTRACT

A lens barrel and an exterior housing have a highly dignified appearance while maintaining excellent strength. The lens barrel has a fixation frame with an opening portion and a switch pedestal cover member that covers the opening portion. A fitted portion is provided on an inner surface side of the cover member and fitted into the opening portion to position the cover member with respect to the fixation frame when the opening portion is covered with the cover member. A fixation portion is provided on an inner surface side of the cover member and disposed inside the fixation frame when the opening portion is covered with the cover member. A spring member engages with the fixation portion and an inner wall surface portion of the fixation frame to bias the cover member towards an inside of the fixation frame. The exterior housing has features similar to the lens barrel.

13 Claims, 11 Drawing Sheets

(56) References Cited

FOREIGN PATENT DOCUMENTS

| | | |
|---|---|---|
| JP | H09-049956 A | 2/1997 |
| JP | H10-160995 A | 6/1998 |
| JP | 2000-082351 A | 3/2000 |
| JP | 2004-207138 A | 7/2004 |
| JP | 2005-250349 A | 9/2005 |
| JP | 2007-087933 A | 4/2007 |
| JP | 2008-041439 A | 2/2008 |
| JP | 2010-122618 A | 6/2010 |
| JP | 2010-186042 A | 8/2010 |
| JP | 2015-014634 A | 1/2015 |
| JP | 2016-138927 A | 8/2016 |

OTHER PUBLICATIONS

An Office Action mailed by China National Intellectual Property Administration dated Aug. 8, 2022, which corresponds to Chinese Patent Application No. 201980074597.5 and is related to U.S. Appl. No. 17/238,648; with English language translation.

* cited by examiner

LENS BARREL AND EXTERIOR HOUSING

CROSS-REFERENCE TO RELATED APPLICATIONS

The present application is a Continuation of PCT International Application No. PCT/JP2019/042859 filed on Oct. 31, 2019 claiming priority under 35 U.S.C § 119(a) to Japanese Patent Application No. 2018-212187 filed on Nov. 12, 2018. Each of the above applications is hereby expressly incorporated by reference, in its entirety, into the present application.

BACKGROUND OF THE INVENTION

1. Field of the Invention

The present invention relates to a lens barrel and an exterior housing.

2. Description of the Related Art

A lens barrel of an interchangeable lens of an interchangeable lens camera may comprise a switch for turning the functions of the lens on or off and switching the settings of the lens. Generally, such a switch is attached by means of a screw (for example, refer to JP2016-138927A and JP1998-160995A (JP-H10-160995A)). However, in a case where the switch is attached by means of a screw, there is a problem that the screw is exposed outside, which impairs the dignity of the product. In a case where a structure in which the switch is fixed with a screw from the inside of the barrel is adopted in order to prevent such a problem, there is a problem that assembly takes time and effort.

Meanwhile, as a method of attaching the switch without using a screw, a structure in which the switch is supported from the inside of the barrel by means of a supporting plate that is attachably and detachably attached to the inside of the barrel has been proposed in JP1997-049956A (JP-H09-049956A). Similarly, as a method of attaching the switch without using a screw, an attachment structure in which a snap fit is used has been proposed in JP2015-014634A.

SUMMARY OF THE INVENTION

However, since the attachment structure in JP1997-049956A (JP-H09-049956A) is a structure in which the switch is supported from below by means of the supporting plate, there is a problem in strength and the structure may be damaged in a case where operation is performed with a strong force. In a case where the structure is configured to have a sufficient strength in order to prevent such a problem, there is a problem that the size of each part is increased and thus the diameter of the barrel is increased.

In addition, the attachment structure in JP2015-014634A is a structure in which attachment is performed by using the elasticity of the snap fit and is a structure in which the snap fit is integrally molded with a cover member of the switch. Therefore, the cover member may also be deformed due to the attachment. Since the cover member is an external component, there is a problem that deformation of the cover member impairs the dignity of the product. In particular, in a case where printing, painting, or the like is performed on the cover member, there is a problem that the deformation causes a print or the like to collapse and significantly impairs the dignity of the product.

Although It is possible to prevent the deformation of the cover member to some extent by securing a sufficient amount of elastic deformation of a snap fit portion, it is necessary to sufficiently secure the length of the snap fit portion to secure the sufficient amount of elastic deformation of the snap fit portion. However, in a case where the length of the snap fit portion is increased, there is a problem that the thickness of the barrel in a radial direction is increased and the barrel becomes large as a whole.

Meanwhile, in a case where the length of the snap fit portion is decreased while securing the strength of the cover member, an excessive load may be applied to a base portion of the snap fit, which may cause damage to the snap fit portion.

The present invention has been made in consideration of such circumstances and an object of the present invention is to provide a lens barrel and an exterior housing with a high appearance dignity and an excellent strength.

The means for solving the above problems are as follows.

(1) A lens barrel comprising a frame that has an opening portion, a cover member that covers the opening portion, a fixation portion that is provided on an inner surface side of the cover member and is disposed inside the frame through the opening portion in a case where the opening portion is covered with the cover member, and a spring member that is engaged with the fixation portion and an inner wall surface portion of the frame and biases the cover member in a direction in which the cover member is pulled into an inside of the frame.

According to the present aspect, the cover member is fixed to the frame by means of the spring member. The spring member biases the cover member in the direction in which the cover member is pulled into the inside of the frame inside the frame such that the cover member is fixed to the frame. Therefore, the spring member, which is a member for fixation, is not exposed outside the frame. Therefore, the dignity of the exterior is not impaired. In addition, the cover member is not fixed by using the elasticity of the cover member, it is possible to sufficiently secure the strength of the cover member. Accordingly, it is possible to secure the strength and the durability.

(2) The lens barrel of (1), in which the opening portion is formed of a single opening.

(3) The lens barrel of (1) or (2), in which the spring member is formed of a leaf spring and has a main body portion mounted onto the fixation portion and a spring portion to be engaged with the inner wall surface portion of the frame.

(4) The lens barrel of (3), in which the frame has a spring member fitting portion that is provided at the inner wall surface portion and into which a portion of the spring portion of the spring member is fitted and the spring member is retained with the portion of the spring portion fitted into the spring member fitting portion.

(5) The lens barrel of (3) or (4), in which the fixation portion has a slit into which a portion of the main body portion of the spring member is inserted and the spring member is mounted onto the fixation portion with the portion of the main body portion inserted into the slit.

(6) The lens barrel of (5), in which the fixation portion is provided at a distal end of a projecting portion having a columnar shape and has the slit in a direction orthogonal to a protruding direction of the projecting portion and the main body portion of the spring member has at least one of a notch or an elongated hole that is inserted into the slit.

(7) The lens barrel of any one of (3) to (6), in which the cover member has an electronic circuit substrate on the inner surface side thereof and the spring member is attached to the cover member with the main body portion engaged with the fixation portion and the main body portion covers the electronic circuit substrate.

(8) The lens barrel of (7), in which the cover member has a switch member.

(9) The lens barrel of (8), in which the switch member is a slide switch.

(10) The lens barrel of any one of (1) to (9), in which the frame has a cylindrical shape.

(11) The lens barrel of any one of (1) to (10), further comprising packing that is mounted between the frame and the cover member.

(12) The lens barrel according to any one of (1) to (11), in which a plurality of the fixation portions are provided at the cover member.

(13) The lens barrel of (12), in which the fixation portions are disposed symmetrically with respect to a center or a center of gravity of the cover member.

(14) The lens barrel of any one of (1) to (11), further comprising a claw portion that is provided at the cover member and is engaged with an edge of the opening portion of the frame.

(15) An exterior housing comprising an exterior body that has an opening portion and has a tubular shape, a cover member that covers the opening portion from an outside of the exterior body, a fixation portion that is provided on an inner surface side of the cover member and is disposed inside the exterior body through the opening portion in a case where the opening portion is covered with the cover member, and a spring member that is engaged with the fixation portion and an inner wall surface portion of the exterior body and biases the cover member in a direction to an inside of the exterior body.

According to the present aspect, the cover member is fixed to the exterior body by means of the spring member. The spring member biases the cover member in the direction in which the cover member is pulled into the inside of the exterior body inside the exterior body such that the cover member is fixed to the exterior body. Therefore, the spring member, which is a member for fixation, is not exposed outside the exterior body. Therefore, the dignity of the exterior is not impaired. In addition, the cover member is not fixed by using the elasticity of the cover member, it is possible to sufficiently secure the strength of the cover member. Accordingly, it is possible to secure the strength and the durability.

According to the aspects of the present invention, it is possible to provide a lens barrel and an exterior housing with a high appearance dignity and an excellent strength.

DESCRIPTION OF THE PREFERRED EMBODIMENTS

Hereinafter, preferable embodiments of the present invention will be described in detail with reference to the attached drawings.

First Embodiment

Here, a case where the present invention is applied to a lens barrel of an interchangeable lens of an interchangeable lens camera will be described as an example.

[Configuration]

Figure 1:
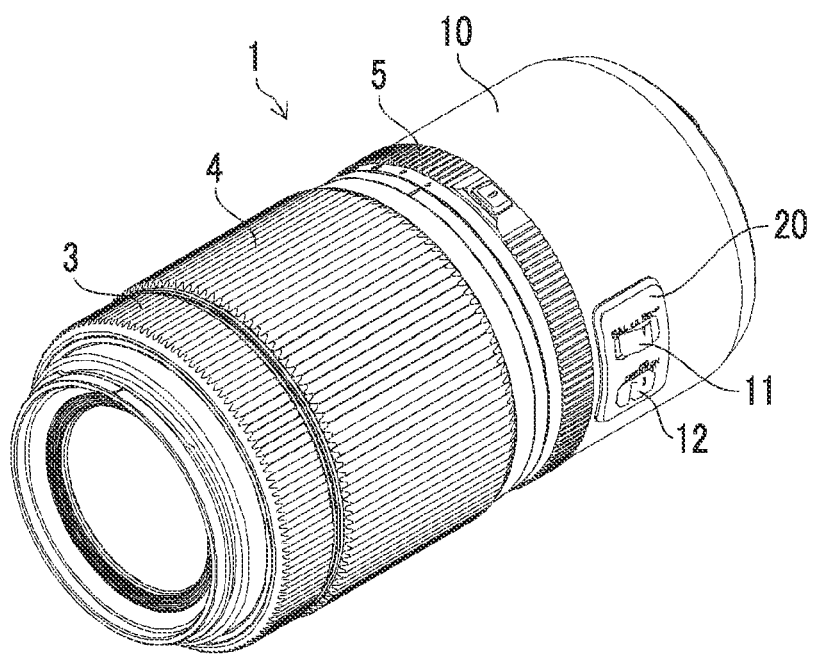
FIG. 1 is a perspective view showing an external configuration of a lens barrel.
Figure 2:
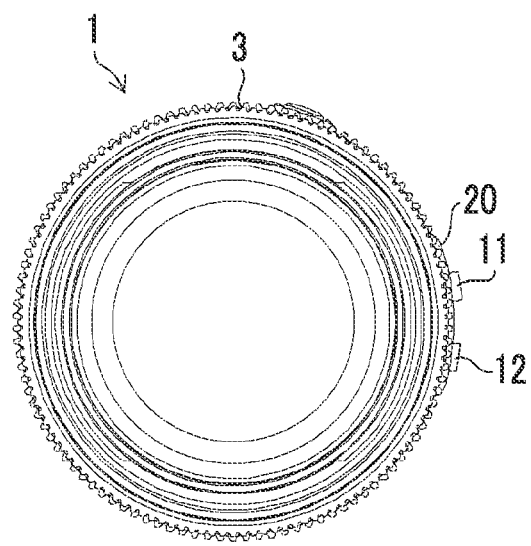
FIG. 2 is a front view showing the external configuration of the lens barrel.
Figure 3:
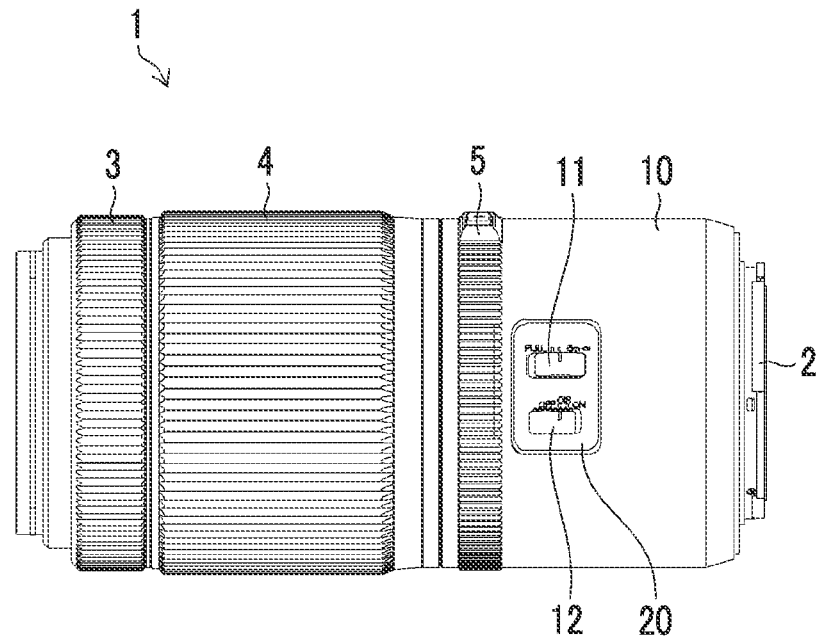
FIG. 3 is a side view showing the external configuration of the lens barrel.
Figure 4:
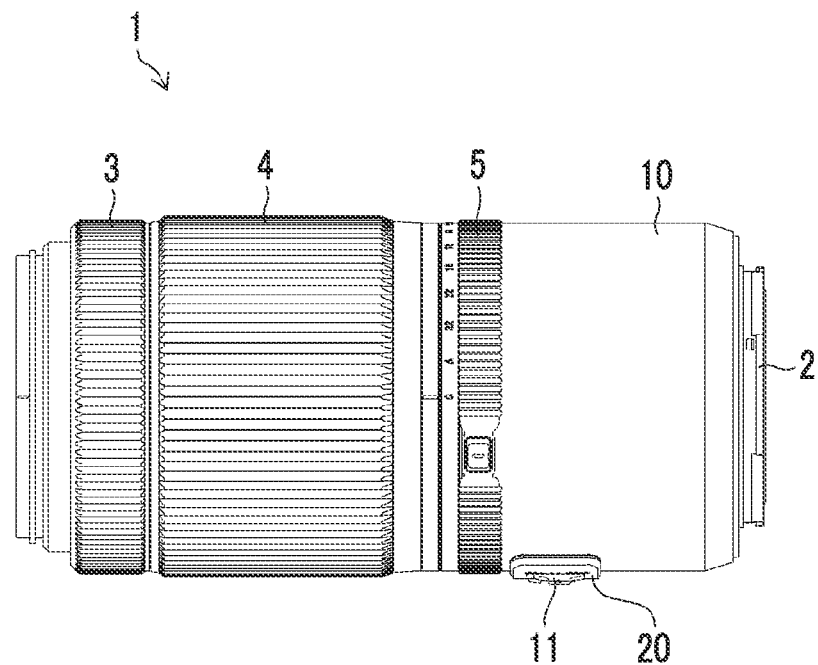
FIG. 4 is a plan view showing the external configuration of the lens barrel.

FIG. 1 is a perspective view showing an external configuration of a lens barrel. FIG. 2 is a front view showing the external configuration of the lens barrel. FIG. 3 is a side view showing the external configuration of the lens barrel. FIG. 4 is a plan view showing the external configuration of the lens barrel.

A lens barrel 1 is a lens barrel of a zoom lens having an optical image stabilizer function (Optical Image Stabilizer (OIS)).

A mount 2 is provided at a base end portion of the lens barrel 1. The lens barrel 1 is attachably and detachably mounted onto a camera body (not shown) via the mount 2.

A focus ring 3, a zoom ring 4, and a stop ring 5 are provided on an outer periphery of the lens barrel 1. The focus ring 3 is an operation member used in the case of manual focus adjustment and is rotated in a circumferential direction. The zoom ring 4 is an operation member used in the case of a zooming operation and is rotated in the circumferential direction. The stop ring 5 is an operation member used in a case where the F number is to be manually set and is rotated in the circumferential direction. The stop ring 5 comprises a click stop mechanism and is click-stopped for each of F numbers settable.

In addition, the lens barrel 1 comprises an imaging distance range switching switch 11 and an optical image stabilizer (OIS) switch 12 on an outer periphery of a fixation frame 10 constituting the exterior of the lens barrel 1.

Figure 5:
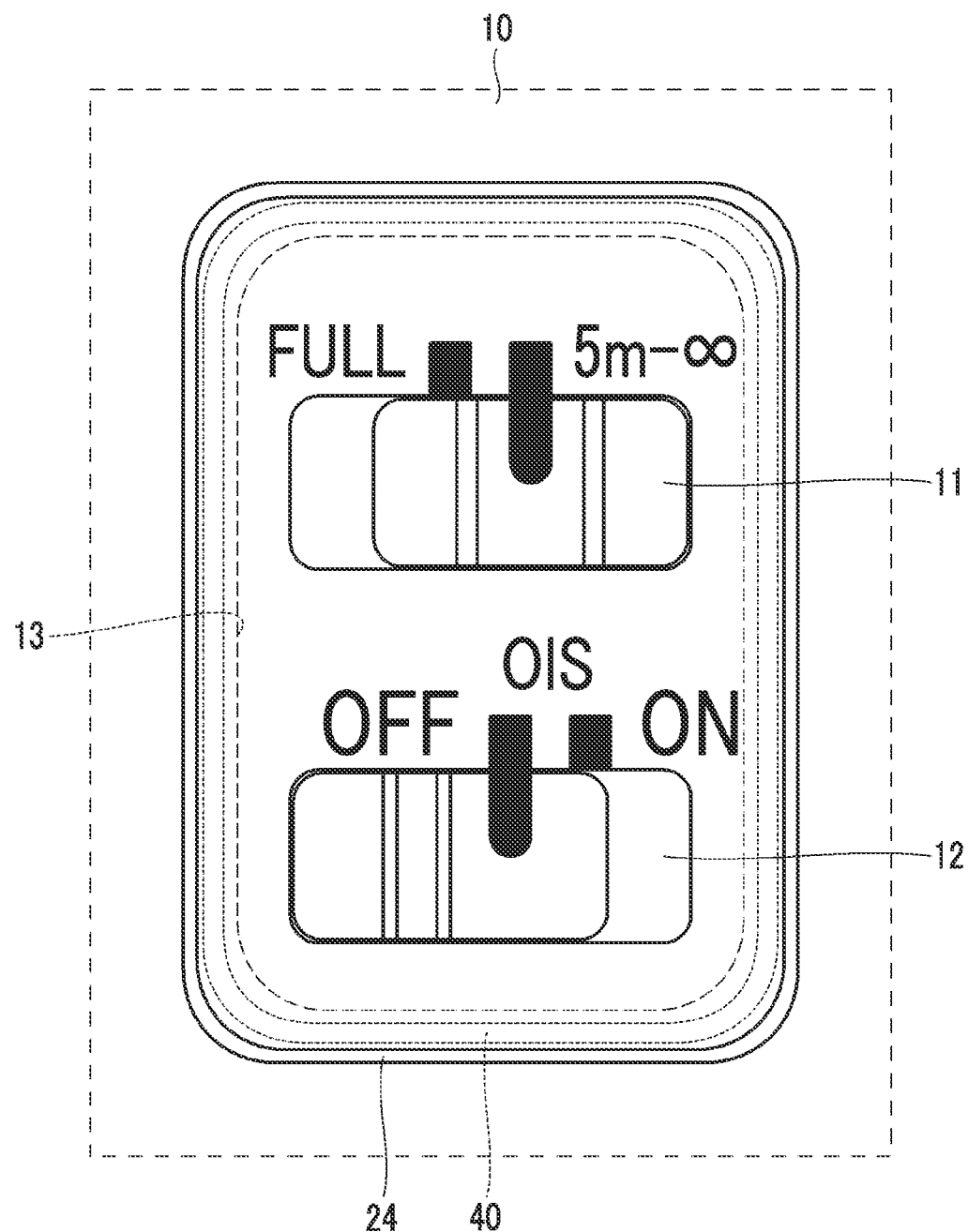
FIG. 5 is an enlarged view of an installation portion of an imaging distance range switching switch and an OIS switch.

FIG. 5 is an enlarged view of an installation portion of the imaging distance range switching switch and the OIS switch.

The imaging distance range switching switch 11 is a switch for switching between autofocus (AF) driving ranges. The imaging distance range switching switch 11 is formed of a slide switch having a click stop function and is slid between a first position (position corresponding to "FULL" in FIG. 5) and a second position (position corresponding to "5 m-∞" in FIG. 5) along an optical axis direction. In a case where the imaging distance range switching switch 11 is set to be at the first position (position corresponding to "FULL" in FIG. 5), autofocus is driven at the entire range (from minimum object distance (MOD) to infinity (∞)). Meanwhile, in a case where the imaging distance range switching switch 11 is set to be at the second position (position corresponding to "5 m-∞" in FIG. 5), autofocus is driven with an imaging distance limited to a range from 5 m to infinity. That is, a range in which a subject comes into focus is limited to the range from 5 m to infinity. By setting the imaging distance range switching switch 11 to be at the second position, it is possible to increase a focusing speed in a case where a distant subject is to be brought in focus. FIG. 5 shows a state in which the imaging distance range switching switch 11 is set to be at the second position.

The OIS switch 12 is a switch for switching the optical image stabilizer function on and off. The OIS switch 12 is formed of a slide switch having a click stop function, and is slid between an ON position (position corresponding to "ON" in FIG. 5) and an OFF position (position corresponding to "OFF" in FIG. 5) along the optical axis direction. In a case where the OIS switch 12 is set to be at the ON position, the optical image stabilizer function is turned on and in a case where the OIS switch 12 is set to be at the OFF position, the optical image stabilizer function is turned off. FIG. 5 shows a state in which the OIS switch 12 is set to be at the OFF position.

The imaging distance range switching switch 11 and the OIS switch 12 are installed onto the common switch pedestal 20 together with a click stop mechanism, an electronic circuit substrate, and the like thereof and are installed onto the lens barrel 1 as a switch assembly. The switch assembly is installed onto the lens barrel 1 in a case where the switch pedestal 20 is installed onto the fixation frame 10. The imaging distance range switching switch 11 and the OIS switch 12 are an example of switch members.

Figure 6:
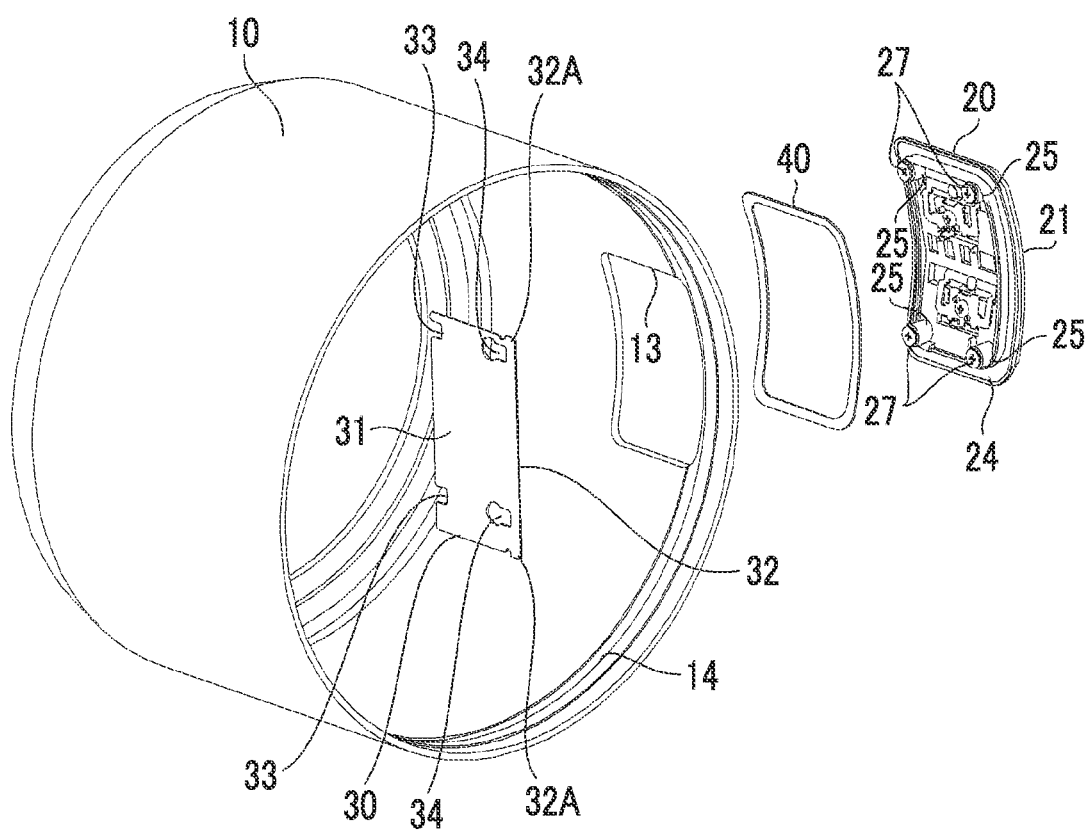
FIG. 6 is an exploded perspective view showing a switch pedestal attachment structure.
Figure 7:
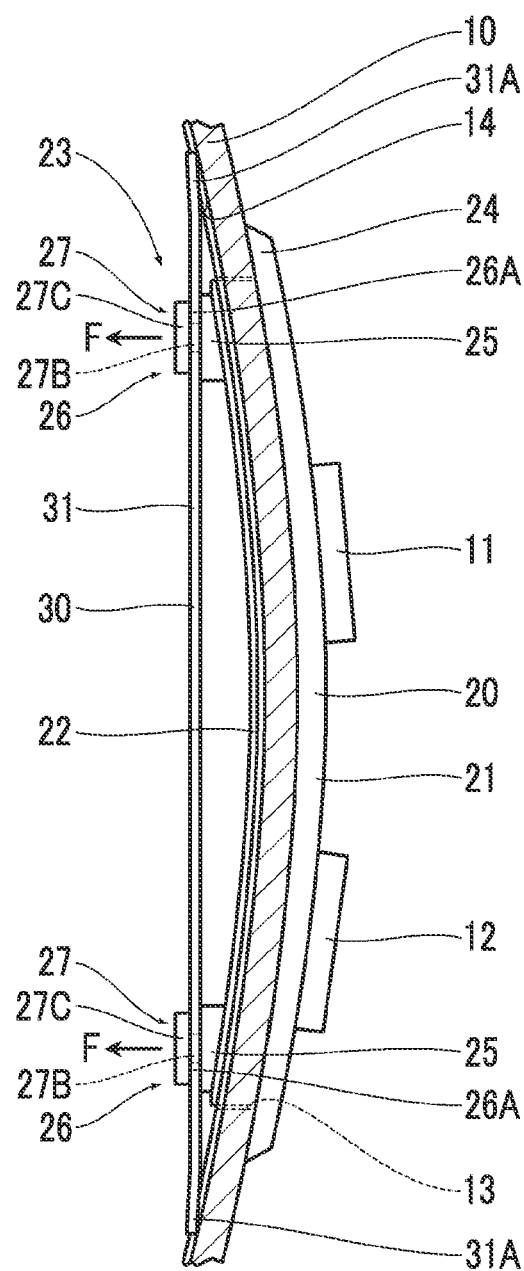
FIG. 7 is a cross-sectional view of a switch pedestal attachment portion.

FIG. 6 is an exploded perspective view showing a switch pedestal attachment structure. In addition, FIG. 7 is a cross-sectional view of a switch pedestal attachment portion.

As shown in the drawings, the fixation frame 10 has a cylindrical shape and has an opening portion 13 formed of a single opening (through-hole) in a peripheral surface thereof. The switch pedestal 20 is attached to the fixation frame 10 such that the switch pedestal 20 covers (closes) the opening portion 13 from the outside of the fixation frame 10. For fixation of the switch pedestal 20, a fixation metal fitting 30 is used. The fixation metal fitting 30 fixes the switch pedestal 20 from the inside of the fixation frame 10. In the lens barrel 1 of the present embodiment, the fixation frame 10 is an example of a frame body and an exterior body. The switch pedestal 20 is an example of a cover member. The fixation metal fitting 30 is an example of a spring member.

Figure 8:
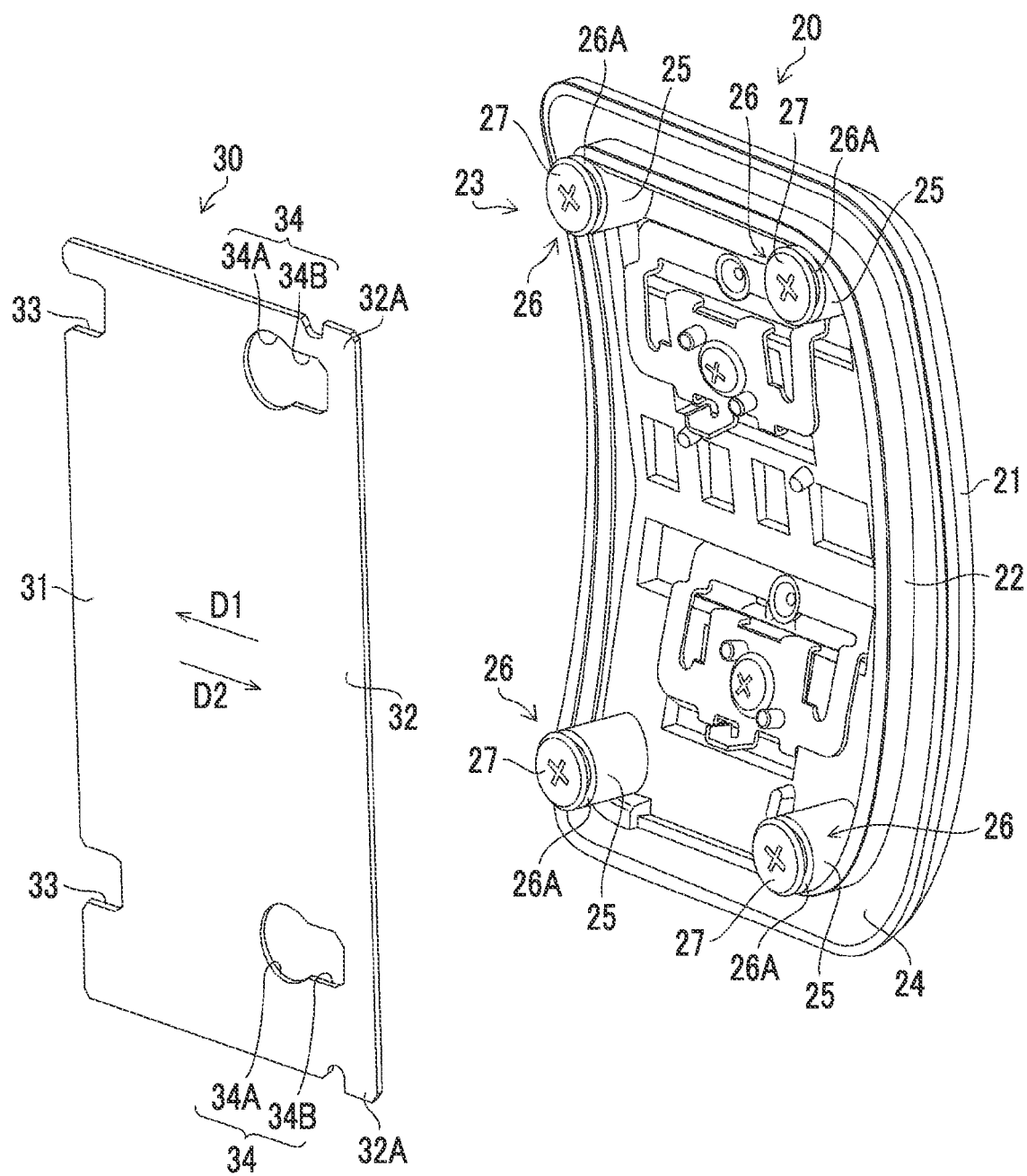
FIG. 8 is a perspective view showing the configuration of a switch pedestal and a fixation metal fitting.

FIG. 8 is a perspective view showing the configuration of the switch pedestal and the fixation metal fitting.

The switch pedestal 20 has a switch pedestal main body 21 and a fitted portion 22 to be fitted into the opening portion 13 and a fixation metal fitting mounting portion 23 onto which the fixation metal fitting 30 is mounted are integrally provided with the switch pedestal main body 21.

The switch pedestal main body 21 is a portion that covers the opening portion 13. The switch pedestal main body 21 has a thin plate shape that is curved along an outer periphery of the fixation frame 10. The switch pedestal main body 21 has a shape corresponding to the opening shape of the opening portion 13. In the case of the lens barrel 1 in the present embodiment, since the opening portion 13 has a rectangular shape (refer to FIG. 6), the switch pedestal main body 21 has a rectangular external shape. Moreover, the size thereof is larger than that of the opening portion 13. That is, the size thereof is sufficient to completely cover the opening portion 13.

The fitted portion 22 is a portion to be fitted into the opening portion 13. The fitted portion 22 has an external shape corresponding to the opening shape of the opening portion 13. The fitted portion 22 is integrally provided on an inner surface side of the switch pedestal main body 21 as a frame-shaped protrusion portion. In a case where the switch pedestal 20 is to be attached to the fixation frame 10, the fitted portion 22 is fitted into the opening portion 13 so that the switch pedestal 20 is attached to the fixation frame 10. Accordingly, the switch pedestal 20 is positioned by the fixation frame 10. The click stop mechanism, the electronic circuit substrate, and the like of the imaging distance range switching switch 11 and the OIS switch 12 are installed inside the fitted portion 22.

The switch pedestal main body 21 is configured such that an outer peripheral portion thereof projects outward from the fitted portion 22. A portion projecting as described above constitutes a flange portion 24. In a case where the switch pedestal 20 is attached to the fixation frame 10, the flange portion 24 is brought into close contact with an outer peripheral surface of the fixation frame 10. Note that, in a case where the switch pedestal 20 is attached to the fixation frame 10, packing 40 is mounted onto an outer periphery of the fitted portion 22 as shown in FIG. 6. The packing 40 is pressed and crushed between the flange portion 24 and the outer peripheral surface of the fixation frame 10 to tightly close the opening portion 13.

The fixation metal fitting mounting portion 23 is a portion to which the fixation metal fitting 30 is mounted. The fixation metal fitting mounting portion 23 is formed of four fixation metal fitting mounting shafts 25. The four fixation metal fitting mounting shafts 25 are provided at four corners on an inner side of the fitted portion 22. Each fixation metal fitting mounting shaft 25 is formed of a columnar projecting portion and is disposed to protrude to the inside of the fixation frame 10 through the opening portion 13 in a case where the switch pedestal 20 is attached to the fixation frame 10. The fixation metal fitting mounting shafts 25 are provided to be parallel with each other. A direction (protruding direction) in which each of the fixation metal fitting mounting shafts 25 protrudes is a direction orthogonal to the optical axis in a case where the switch pedestal 20 is attached to the fixation frame 10.

Figure 9:
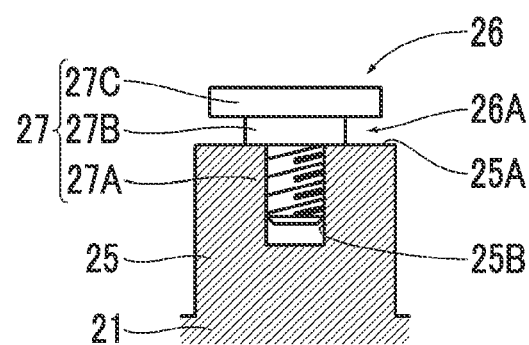
FIG. 9 is a cross-sectional view partially showing the configuration of a fixation metal fitting mounting shaft.

FIG. 9 is a cross-sectional view partially showing the configuration of the fixation metal fitting mounting shaft.

As described above, the fixation metal fitting mounting shaft 25 is formed of a columnar projecting portion. A fixation portion 26 is provided at a distal end of the fixation metal fitting mounting shaft 25. The fixation portion 26 is a portion to be engaged with the fixation metal fitting 30. The fixation portion 26 is formed of a screw 27 attached to the distal end of the fixation metal fitting mounting shaft 25. The screw 27 has a screw portion 27A, a shaft portion 27B, and a head portion 27C. A screw hole 25B is provided at the center of a distal end surface 25A of the fixation metal fitting mounting shaft 25. The screw 27 is attached to the distal end of the fixation metal fitting mounting shaft 25 with the screw portion 27A screwed into the screw hole 25B and is attached coaxially.

The shaft portion 27B of the screw 27 is configured to have a diameter smaller than that of the head portion 27C and the fixation metal fitting mounting shaft 25. In addition, the head portion 27C is configured to have a smaller diameter than that of the fixation metal fitting mounting shaft 25. As a result, in the case of the fixation metal fitting mounting shaft 25 with the screw 27 attached thereto, a slit (recess portion) 26A is formed between the head portion 27C of the screw 27 and the distal end surface 25A. The slit 26A functions as an engagement portion with respect to the fixation metal fitting 30.

The slits 26A of the fixation metal fitting mounting shafts 25 are disposed at the same height as each other. That is, the slits 26A provided at the fixation metal fitting mounting shafts 25 are disposed on the same plane. This plane is a plane parallel with the optical axis. In the lens barrel 1 of the present embodiment, the fixation metal fitting mounting shafts 25 are an example of columnar projecting portions.

The fixation metal fitting 30 is formed of a leaf spring and is formed of one thin metal plate. The thickness thereof is a thickness corresponding to the width of each of the slits 26A provided at the fixation portions 26 of the fixation metal fitting mounting shafts 25. That is, the fixation metal fitting 30 has a thickness such that the fixation metal fitting 30 can be inserted into the slits 26A. The fixation metal fitting 30 has a main body portion 31 to be mounted onto the switch pedestal 20 and a spring portion 32 to be engaged with an inner wall surface portion of the fixation frame 10.

The main body portion 31 has a rectangular flat plate shape. The main body portion 31 has a size such that the main body portion 31 covers almost the entire surface of an inner side of the switch pedestal main body 21 in a case where the main body portion 31 is attached to the switch pedestal 20.

The main body portion 31 comprises a pair of notch portions 33 and a pair of elongated hole portions 34 as portions to be mounted onto the fixation metal fitting mounting portion 23.

The pair of notch portions 33 is disposed at predetermined intervals on one side (long side) of the main body portion 31 along a longitudinal direction thereof. The notch portions 33 are formed of U-shaped grooves cut in a direction orthogonal to a direction (longitudinal direction of main body portion 31) in which the notch portions 33 are disposed. The notch portion 33 has a width corresponding to the outer diameter of the shaft portion 27B of the screw 27. That is, the notch portion 33 has a width such that the shaft portion 27B of the screw 27 is fitted thereinto.

The pair of elongated hole portions 34 is disposed at predetermined intervals along the longitudinal direction of the main body portion 31. The elongated hole portions 34 are formed of holes extending in a direction orthogonal to a direction (longitudinal direction of main body portion 31) in which the elongated hole portions 34 are disposed and have large-diameter portions 34A and small-diameter portions 34B. Each large-diameter portion 34A has a diameter (width) such that the head portion 27C of the screw 27 can be inserted thereinto and is disposed closer to the notch portion 33 than the small-diameter portion 34B. Each small-diameter portion 34B has a diameter (width) such that the shaft portion 27B of the screw 27 can be inserted thereinto.

The pair of notch portions 33 and the pair of elongated hole portions 34 are disposed at the same intervals as the four fixation metal fitting mounting shafts 25 constituting the fixation metal fitting mounting portion 23. That is, the pair of notch portions 33 and the pair of elongated hole portions 34 are disposed at positions where the pair of notch portions 33 and the pair of elongated hole portions 34 can be engaged with the four fixation metal fitting mounting shafts 25.

In a case where the fixation metal fitting 30 is to be mounted onto the fixation metal fitting mounting portion 23, first, the pair of notch portions 33 and the pair of elongated hole portions 34 are positionally aligned with the four fixation metal fitting mounting shafts 25. Next, the head portions 27C of the screws 27 provided at the distal ends of the fixation metal fitting mounting shafts 25 are caused to pass through the large-diameter portions 34A of the elongated hole portions 34. Accordingly, the main body portion 31 of the fixation metal fitting 30 is placed on the distal end surface 25A of each fixation metal fitting mounting shaft 25. Next, the main body portion 31 of the fixation metal fitting 30 is slid along the notch portions 33 and the elongated hole portions 34 such that the shaft portions 27B of the screws 27 are fitted into the small-diameter portions 34B of the elongated hole portions 34 and the notch portions 33. Accordingly, the main body portion 31 of the fixation metal fitting 30 is inserted into the slits 26A provided at the distal ends of the fixation metal fitting mounting shafts 25 and the fixation metal fitting 30 is mounted onto the fixation metal fitting mounting portion 23. That is, the main body portion 31 of the fixation metal fitting 30 is held by being interposed between the slits 26A. In this case, the fixation metal fitting 30 is held in a posture of being substantially parallel with the optical axis.

In a case where the fixation metal fitting 30 is to be detached, the fixation metal fitting 30 is slid in a direction opposite to a direction in which the fixation metal fitting 30 is slid in a case where the fixation metal fitting 30 is to be mounted. Accordingly, the main body portion 31 is extracted from the slits 26A and thus detachment of the fixation metal fitting 30 becomes possible. The fixation metal fitting 30 is detached from the fixation metal fitting mounting portion 23 in a case where the head portions 27C of the screws 27 are removed from the large-diameter portions 34A of the elongated hole portions 34.

In this manner, as described above, attachment and detachment of the fixation metal fitting 30 are performed by sliding the fixation metal fitting 30 with respect to the fixation metal fitting mounting portion 23.

The direction in which the fixation metal fitting 30 is slid in a case where the fixation metal fitting 30 is to be mounted onto the fixation metal fitting mounting portion 23 will be referred to as a "mounting direction" D1 and the direction in which the fixation metal fitting 30 is slid in a case where the fixation metal fitting 30 is to be detached from the fixation metal fitting mounting portion 23 will be referred to as a "detachment direction" D2. Both of the mounting direction D1 and the detachment direction D2 are directions orthogonal to the longitudinal direction of the fixation metal fitting 30. In addition, the directions are directions substantially parallel with the optical axis.

In addition, a position where the shaft portions 27B of the screws 27 are fitted into the small-diameter portions 34B of the elongated hole portions 34 and the notch portions 33 will be referred to as a "mounting position" and a position where the head portions 27C of the screws 27 are disposed at the large-diameter portions 34A of the elongated hole portions 34 will be referred to as a "detachment position". The mounting position is a position where the main body portion 31 of the fixation metal fitting 30 is inserted into the slits 26A and the detachment position is a position where the main body portion 31 of the fixation metal fitting 30 is extracted from the slits 26A. The pair of notch portions 33 is provided at a side on a front side in the mounting direction D1 and is provided to be open toward the front side in the mounting direction D1. In addition, the pair of elongated hole portions 34 is disposed along the mounting direction D1 and the large-diameter portions 34A are provided on the front side in the mounting direction D1.

The spring portion 32 is provided at a rear side end portion in the mounting direction with respect to the main body portion 31. The spring portion 32 has a pair of protruding portions 32A extending in a direction orthogonal to the mounting direction. The pair of protruding portions 32A functions as portions to be engaged with an inner peripheral surface (inner wall surface portion) of the fixation frame 10. In a case where the fixation metal fitting 30 is mounted onto the switch pedestal 20 attached to the fixation frame 10, the pair of protruding portions 32A abuts the inner peripheral surface of the fixation frame 10. Due to the protruding portions 32A abutting the inner peripheral surface, elastic deformation of the spring portion 32 occurs and thus the switch pedestal 20 is biased inward due to elastic restoring force thereof. That is, the switch pedestal 20 is biased in a direction in which the switch pedestal 20 is pulled into the inside of the fixation frame 10. Accordingly, the switch pedestal 20 is fixed to the fixation frame 10.

As shown in FIG. 6, the inner peripheral surface (inner wall surface portion) of the fixation frame 10 comprises a cyclic groove portion 14 into which the protruding portions 32A of the spring portion 32 are fitted. The groove portion 14 is an example of a spring member fitting portion and is formed along the circumferential direction. The groove portion 14 is provided at a position such that the protruding portions 32A are fitted thereinto in a case where the fixation metal fitting 30 is positioned at the mounting position. Accordingly, the protruding portions 32A are fitted into the groove portion 14 in a case where the fixation metal fitting 30 is positioned at the mounting position and the protruding portions 32A are removed from the groove portion 14 in a case where the fixation metal fitting 30 is positioned at the detachment position. In a case where the protruding portions 32A are fitted into the groove portion 14, the movement of the fixation metal fitting 30 in a sliding direction is restricted and is locked at a certain position.

[Action]

Figure 10:
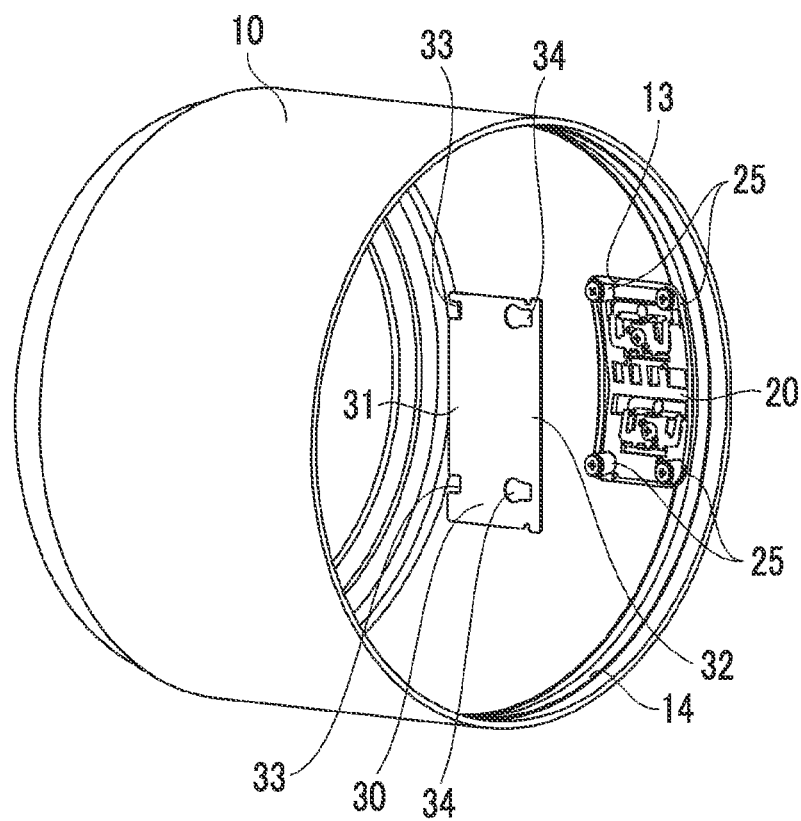
FIG. 10 is a view showing a procedure for attaching the switch pedestal.
Figure 11:
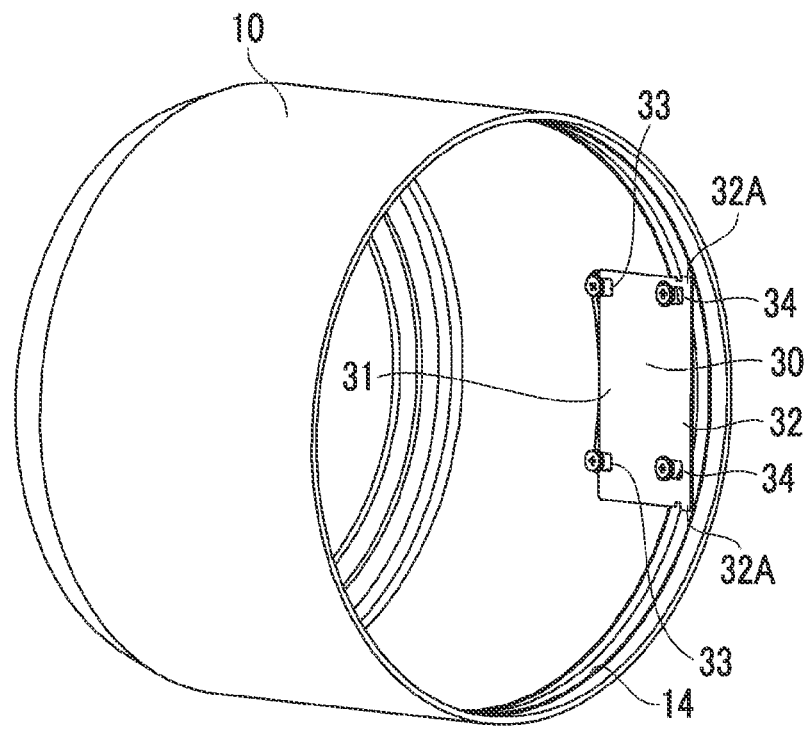
FIG. 11 is a view showing the procedure for attaching the switch pedestal.
Figure 12:
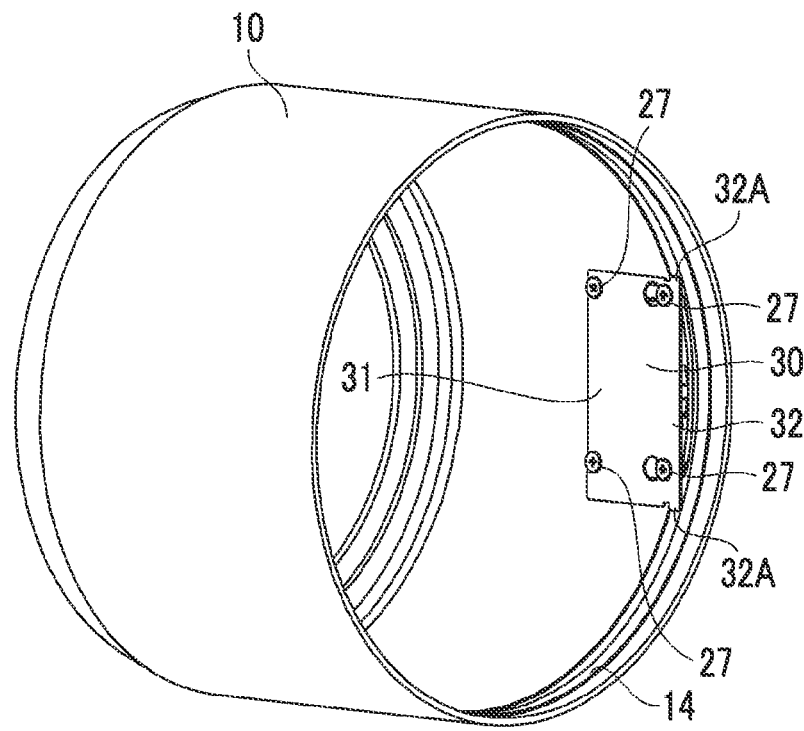
FIG. 12 is a view showing the procedure for attaching the switch pedestal.

FIGS. 10, 11, and 12 are views showing a procedure for attaching the switch pedestal.

First, as shown in FIG. 10, the fitted portion 22 of the switch pedestal 20 is fitted into the opening portion 13 provided in the fixation frame 10. In this case, the fitted portion 22 is fitted into the opening portion 13 with the packing 40 mounted on the outer periphery of the fitted portion 22 (refer to FIG. 6). Accordingly, the switch pedestal 20 is positioned with respect to the fixation frame 10.

Next, as shown in FIG. 11, the fixation metal fitting 30 is set with respect to the switch pedestal 20. That is, the pair of notch portions 33 and the pair of elongated hole portions 34 provided at the fixation metal fitting 30 are positionally aligned with the four fixation metal fitting mounting shafts 25 and the head portions 27C of the screws 27 provided at the distal ends of the fixation metal fitting mounting shafts 25 are caused to pass through the large-diameter portions 34A of the elongated hole portions 34. Accordingly, the main body portion 31 of the fixation metal fitting 30 is placed on the distal end surface 25A of each fixation metal fitting mounting shaft 25 and the fixation metal fitting 30 is set with respect to the switch pedestal 20. In this state, the fixation metal fitting 30 is positioned at the "detachment position".

The pair of protruding portions 32A constituting the spring portion 32 of the fixation metal fitting 30 set on the switch pedestal 20 abuts the inner peripheral surface (inner wall surface portion) of the fixation frame 10.

Next, the fixation metal fitting 30 is slid in the mounting direction D1 to be positioned at the mounting position. In this case, the main body portion 31 of the fixation metal fitting 30 is pushed to be slid in the mounting direction D1 with the spring portion 32 bent.

In a case where the fixation metal fitting 30 is positioned at the mounting position, the shaft portions 27B of the screws 27 are fitted into the small-diameter portions 34B of the elongated hole portions 34 and the notch portions 33. At the same time, the main body portion 31 of the fixation metal fitting 30 is inserted into the slits 26A provided at the distal ends of the fixation metal fitting mounting shafts 25.

In addition, in a case where the fixation metal fitting 30 is positioned at the mounting position, as shown in FIG. 12, the pair of protruding portions 32A constituting the spring portion 32 of the fixation metal fitting 30 is fitted into the groove portion 14 provided on the inner peripheral surface of the fixation frame 10. In this case, the spring portion 32 is fitted into the groove portion 14 in a state of being bent. As a result, an elastic restoring force acts on the spring portion 32. The force acts as a force F that pulls each fixation metal fitting mounting shaft 25 toward the inside of the fixation frame 10 (refer to FIG. 7). Due to the force F, the flange portion 24 of the switch pedestal 20 is pressed against the outer peripheral surface of the fixation frame 10 and is fixed to the fixation frame 10. In addition, due to the force F, the packing 40 provided at the flange portion 24 is pressed and crushed and thus the opening portion 13 is sealed in an airtight state.

In a case where the protruding portion 32A is fitted into the groove portion 14, a click sound is generated due to the action of the spring portion 32. In addition, a click feeling is transmitted to an operating finger. By means of the click sound or the click feeling, an operator who performs attachment can recognize that the protruding portions 32A are fitted into the groove portion 14, that is, the protruding portions 32A are positioned at the mounting position.

In a case where the protruding portions 32A are fitted into the groove portion 14, the fixation metal fitting 30 is locked such that the fixation metal fitting 30 is not easily removed even in a case where vibration or impact is received.

In a case where the switch pedestal 20 is to be detached from the fixation frame 10, the switch pedestal 20 is detached through a procedure reverse to the above-described procedure. First, the fixation metal fitting 30 is slid in the detachment direction. Accordingly, the main body portion 31 of the fixation metal fitting 30 is extracted from the slits 26A and is disengaged. Thereafter, the switch pedestal 20 is detached from the fixation metal fitting 30 so that detachment of the switch pedestal 20 becomes possible.

As described above, according to the lens barrel 1 of the present embodiment, the switch pedestal 20 on which the imaging distance range switching switch 11 and the OIS switch 12 are installed is attached to the fixation frame 10 as a switch assembly so that the imaging distance range switching switch 11 and the OIS switch 12 are installed onto the lens barrel 1. Since the switch pedestal 20 is attached without using screws and is attached by means of the fixation metal fitting 30, the dignity of the product is not impaired. In addition, since it is possible to easily attach and detach the fixation metal fitting 30 by means of a sliding operation, the time and effort for attachment and detachment can be significantly reduced. In addition, since the switch pedestal 20 is fixed with the flange portion 24 pressed against the fixation frame 10 while abutting the fixation frame 10, a sufficient strength and durability can be secured even in a case where an operation is performed repeatedly. In addition, since the switch pedestal 20 is fixed by means of elastic deformation of the fixation metal fitting 30 instead of elastic deformation of the switch pedestal 20, a sufficient strength of the switch pedestal itself can be secured. Accordingly, it is possible to reduce the thickness thereof. Furthermore, it is also possible to reduce the outer diameter of the lens barrel 1.

Furthermore, according to the lens barrel 1 of the present embodiment, since an inner surface portion of the switch pedestal 20 is covered with the fixation metal fitting 30 made of metal, a shielding property with respect to the imaging distance range switching switch 11 and the OIS switch 12 can be secured. For size reduction, structures inside the lens barrel are disposed to be near each other. For example, in a case where a strong magnet is used for a drive motor of a lens and the magnet is disposed near an installation portion of a switch, a signal wire or the like of the switch is likely to be influenced by noise. In the lens barrel 1 of the present embodiment, since the inner surface portion of the switch pedestal 20 is covered with the fixation metal fitting 30 made of metal, it is possible to secure the shielding property against magnetism.

Second Embodiment

Figure 13:
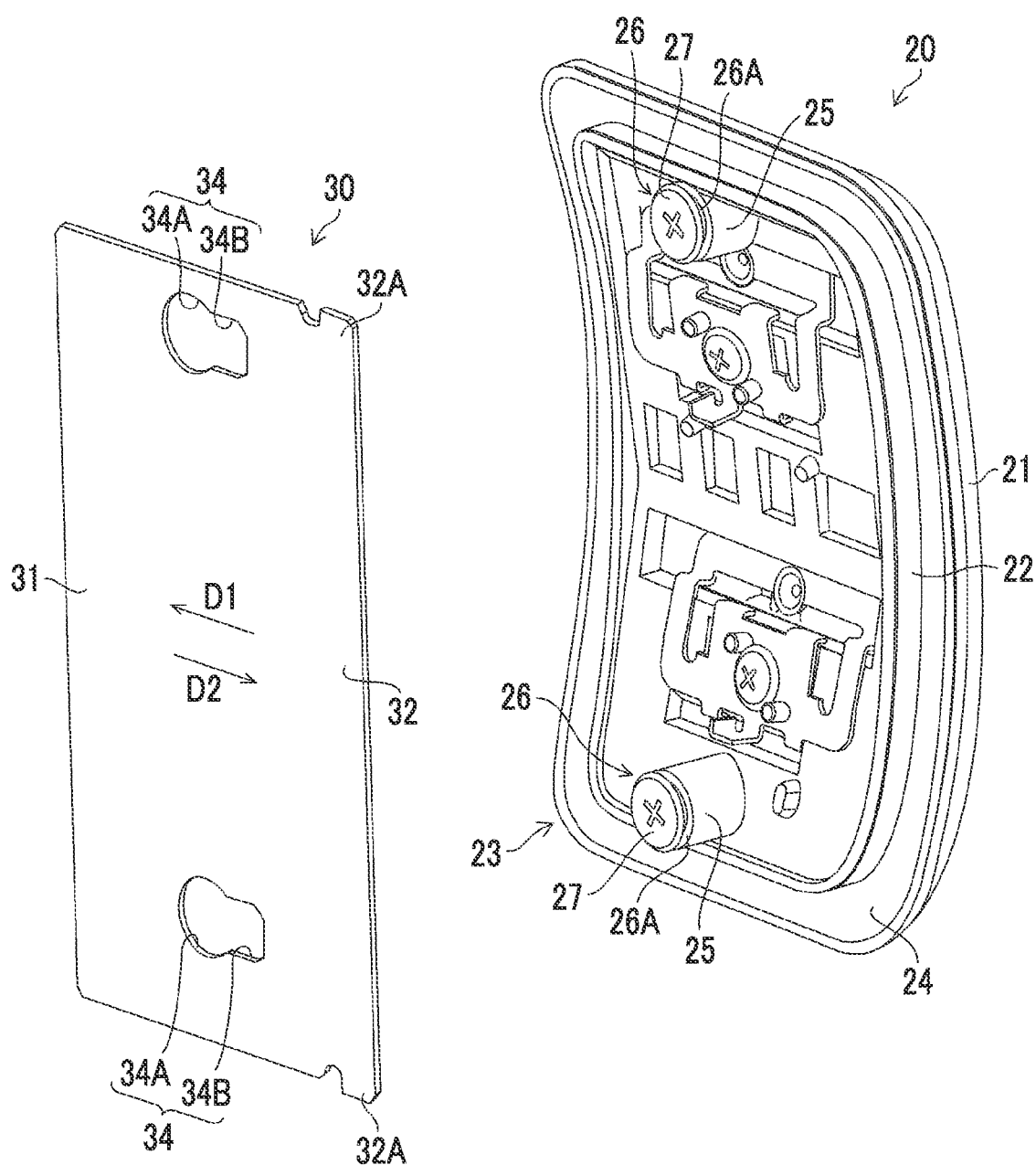
FIG. 13 is a perspective view showing the configuration of the switch pedestal and the fixation metal fitting.

FIG. 13 is a perspective view showing the configuration of the switch pedestal and the fixation metal fitting.

As shown in the drawing, in the case of the switch pedestal 20 of the present embodiment, the fixation metal fitting mounting portion 23 is formed of two fixation metal fitting mounting shafts 25. The two fixation metal fitting mounting shafts 25 are disposed symmetrically with respect to a straight line that extends through the center of the switch pedestal main body 21 and is parallel with the mounting direction D1 and the detachment direction D2.

The main body portion 31 of the fixation metal fitting 30 comprises the pair of elongated hole portions 34 corresponding to the fixation metal fitting mounting shafts 25.

The switch pedestal 20 of the present embodiment has a structure in which the fixation metal fitting 30 is supported at two positions. Even in the case of such a structure, fixation with respect to the switch pedestal 20 can be performed in the same manner as the lens barrel 1 of the first embodiment and the switch pedestal 20 can be fixed to the fixation frame 10 with the switch pedestal 20 biased to the inside of the fixation frame 10.

It is preferable that the number of fixation metal fitting mounting shafts 25 constituting the fixation metal fitting mounting portion 23 is set in consideration of the size and the like of the switch pedestal main body 21.

In addition, regarding positions where the fixation metal fitting mounting shafts 25 are provided, it is preferable that the fixation metal fitting mounting shafts 25 are disposed symmetrically with respect to the center or the center of gravity of the switch pedestal main body 21. In particular, it is preferable that the fixation metal fitting mounting shafts 25 are disposed symmetrically with respect to a straight line that extends through the center or the center of gravity of the switch pedestal main body 21 and is parallel with the mounting direction and the detachment direction.

Third Embodiment

Figure 14:
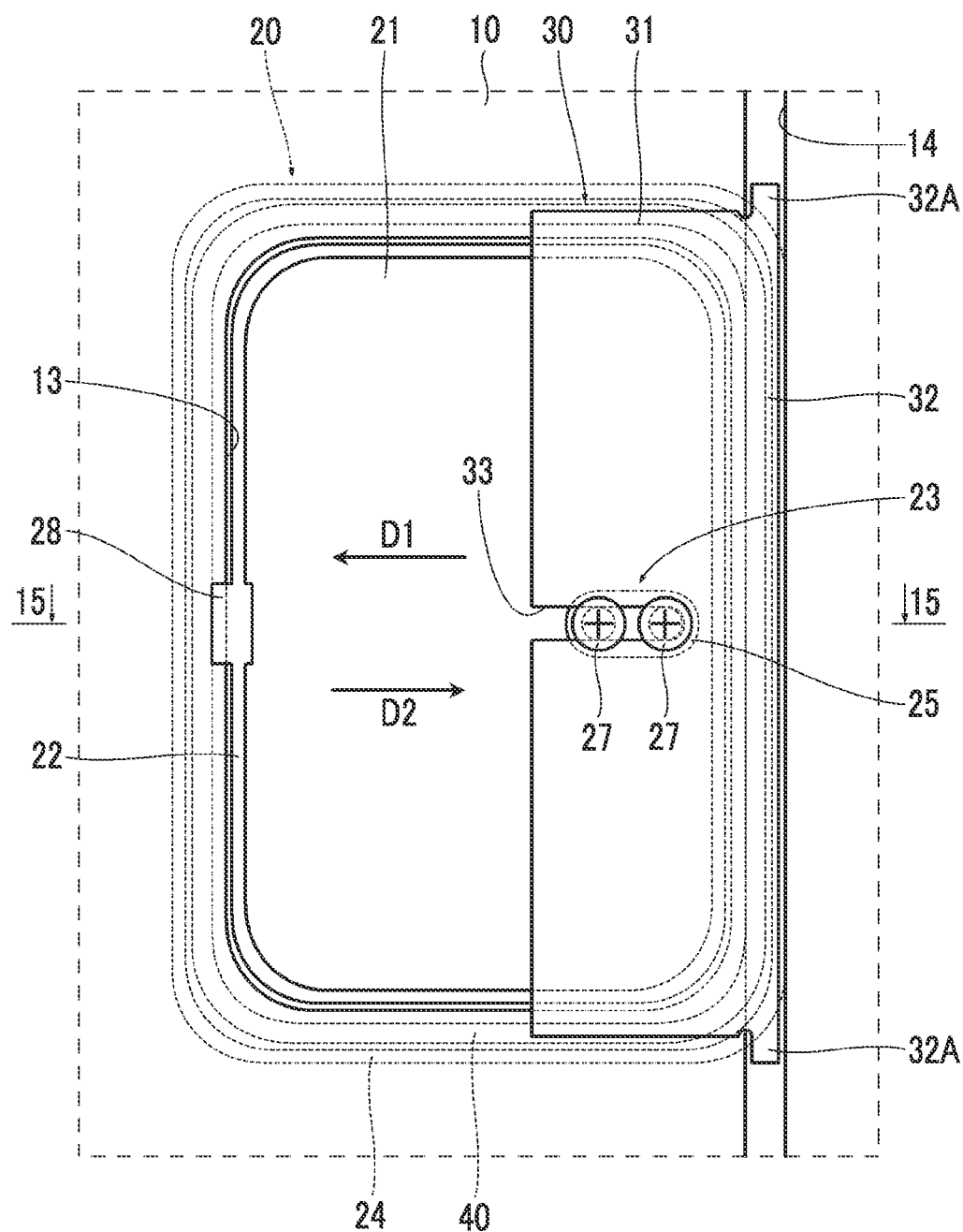
FIG. 14 is a view showing a schematic configuration of an attachment portion of the switch pedestal.
Figure 15:
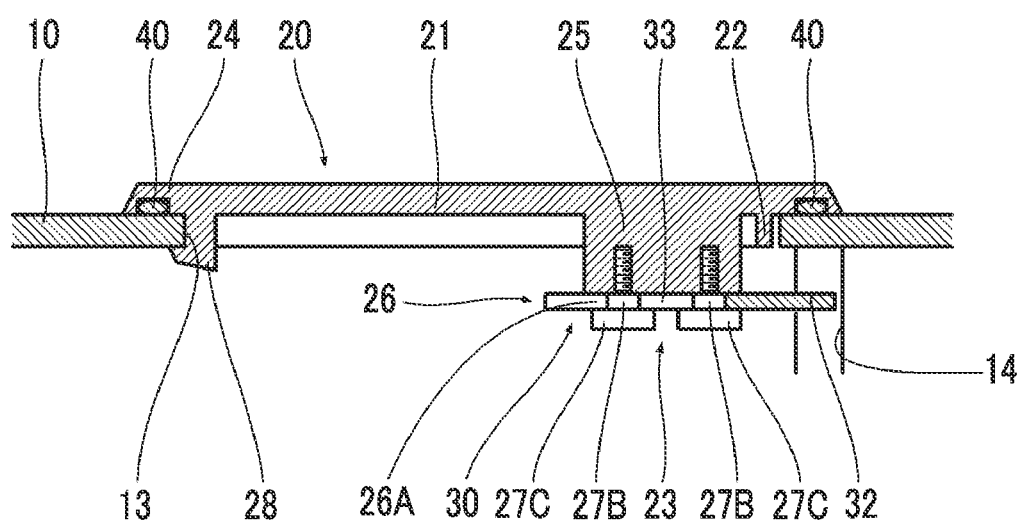
FIG. 15 is a cross-sectional view taken along line 15-15 of FIG. 14.

FIG. 14 is a view showing a schematic configuration of an attachment portion of the switch pedestal. The drawing is a view of the attachment portion of the switch pedestal 20 as seen from the inside of the fixation frame 10. Note that, in the drawing, the switch and the like installed onto the switch pedestal 20 is not shown for the sake of simplicity of the description. FIG. 15 is a cross-sectional view taken along line 15-15 of FIG. 14.

As shown in the drawing, in the case of the switch pedestal 20 of the present embodiment, the switch pedestal main body 21 is integrally provided with a claw portion 28. The claw portion 28 is provided on a portion of the fitted portion 22. The claw portion 28 is engaged with an edge of the opening portion 13 of the fixation frame 10 to retain the switch pedestal 20.

The claw portion 28 is disposed on a straight line L that extends through the center of the switch pedestal main body 21 and is parallel with the mounting direction D1 and the detachment direction D2. The fixation metal fitting mounting portion 23 is provided on the straight line L. In the present embodiment, the fixation metal fitting mounting portion 23 is formed of one fixation metal fitting mounting shaft 25.

At the distal end of the fixation metal fitting mounting shaft 25, two screws 27 are provided as the fixation portions 26. The two screws 27 are disposed along the straight line L. The slits (recess portions) 26A are formed between the head portions 27C of the screws 27 and a distal end surface of the fixation metal fitting mounting shaft 25. The slits 26A function as engagement portions with respect to the fixation metal fitting 30.

The main body portion 31 of the fixation metal fitting 30 is provided with the notch portion 33. The notch portion 33 is formed of a U-shaped groove cut along the mounting direction D1 and the detachment direction D2. The notch portion 33 has a width corresponding to the outer diameter of the shaft portion 27B of the screw 27. That is, the notch portion 33 has a width such that the shaft portion 27B of the screw 27 is fitted thereinto.

Note that, in the present embodiment, the fixation metal fitting 30 is attached to the switch pedestal 20 to cover a portion of an inner surface portion of the switch pedestal main body 21.

The switch pedestal 20 of the present embodiment configured as described is attached to the fixation frame 10 through a procedure as follows.

First, the fitted portion 22 of the switch pedestal 20 is fitted into the opening portion 13 provided in the fixation frame 10. In this case, the fitted portion 22 is fitted into the opening portion 13 with the packing 40 mounted on the outer periphery of the fitted portion 22.

In a case where the fitted portion 22 is fitted into the opening portion 13, the claw portion 28 is engaged with the edge of the opening portion 13. Accordingly, the switch pedestal 20 is temporarily retained at the outer periphery of the fixation frame 10.

Next, the fixation metal fitting 30 is set with respect to the switch pedestal 20. That is, the notch portion 33 provided at the fixation metal fitting 30 and the fixation metal fitting mounting shaft 25 are positionally aligned with each other.

Next, the fixation metal fitting 30 is slid in the mounting direction D1 to be positioned at the mounting position. In this case, the main body portion 31 of the fixation metal fitting 30 is pushed to be slid in the mounting direction D1 with the spring portion 32 bent. In a case where the fixation metal fitting 30 is positioned at the mounting position, the shaft portions 27B of the two screws 27 are fitted into notch portion 33. At the same time, the main body portion 31 of the fixation metal fitting 30 is inserted into the slits 26A provided at the distal end of each fixation metal fitting mounting shaft 25. Furthermore, the pair of protruding portions 32A constituting the spring portion 32 of the fixation metal fitting 30 is fitted into the groove portion 14 provided on the inner peripheral surface of the fixation frame 10. In this case, the spring portion 32 is fitted into the groove portion 14 in a state of being bent. As a result, an elastic restoring force acts on the spring portion 32. The force acts as the force F that pulls each fixation metal fitting mounting shaft 25 toward the inside of the fixation frame 10. Accordingly, the switch pedestal 20 is fixed to the fixation frame 10.

As described above, since the switch pedestal 20 comprises the claw portion 28, a structure in which the fixation metal fitting 30 is supported at one position can be adopted.

Note that, although a configuration in which the fixation metal fitting 30 is supported at one position is adopted in the present embodiment, a configuration in which the fixation metal fitting 30 is supported at a plurality of positions can also be adopted even in a case where the claw portion is provided.

Regarding a position where the claw portion is provided, it is preferable that the claw portion is provided at a side on the front side in the mounting direction D1. In addition, regarding a position where the fixation metal fitting mounting shaft is provided, it is preferable that the fixation metal fitting mounting shaft is provided in the vicinity of a side opposite to the side where the claw portion is provided.

Other Embodiments

[Modification Example of Cover Member]

In the above-described embodiments, a case where the present invention is applied to attachment of a switch pedestal has been described as an example. However, the application of the present invention is not limited thereto. For example, the present invention can also be applied to attachment of a pedestal of another member (for example, attachment or like of pedestal onto which liquid crystal display (LCD) panel is installed), attachment of a cover or the like covering an opening portion, or the like.

Note that, in a case where the present invention is applied to attachment of a switch pedestal, the type of a switch provided at the switch pedestal, the number of switches, or the like are not particularly limited. For example, one button type switch may be provided. In addition, a cross key, a seesaw switch, or the like may also be provided. In addition, a member (for example, display panel or like) other than a switch may also be provided.

In addition, as long as the opening portion covered by the cover member is formed of a single opening (through-hole), the shape of the opening is not limited. Therefore, for example, the shape of the opening portion may be circular.

[Modification Example of Projecting Portion and Fixation Portion]

In the above-described embodiments, the shape of the fixation metal fitting mounting shaft 25, which is a projecting portion, is a columnar shape. However, the shape of the projecting portion is not particularly limited. The shape thereof may be any shape as long as the projecting portion can protrude to the inside of a frame through the opening portion.

In addition, the projecting portion does not need to be integrally molded with the cover member and may be configured as a separate member. That is, a configuration in which the projecting portion is separately installed onto the cover member may also be adopted.

In addition, in the above-described embodiments, the fixation portion provided at the projecting portion is formed of the screw. However, the fixation portion may be configured as an integrally molded component. The fixation portion may be configured as an integrally molded component by using resin and may be formed by processing a slit or the like.

[Modification Example of Spring Member]

In the above-described embodiments, the spring member is formed of the fixation metal fitting 30 formed of a leaf spring. However, the configuration of the spring member is not limited thereto. The spring member may have any configuration as long as the spring member is engaged with the fixation portion 26 of the fixation metal fitting mounting shaft 25 (projecting portion) provided at the switch pedestal 20 (cover member) and the inner wall surface portion of the fixation frame 10 (frame) and the switch pedestal 20 can be biased in a direction in which the switch pedestal 20 is pulled into the inside of the fixation frame 10.

In addition, in the above-described embodiments, the fixation metal fitting 30 (spring member) formed of a leaf spring is inserted into the slit 26A provided at the fixation portion 26 such that the fixation metal fitting 30 is engaged with the fixation metal fitting mounting shaft 25. However, the way in which the fixation metal fitting 30 is engaged with the fixation portion 26 is not limited thereto. Any configuration may be adopted as long as the fixation metal fitting 30 can be easily mounted onto the fixation metal fitting mounting shaft 25 and is not likely to be removed therefrom. In this respect, in the case of the structure in the above-described embodiments, the fixation metal fitting 30 can be easily mounted since the fixation metal fitting 30 only needs to be slid in one direction and inserted into the slit 26A. In addition, the fixation metal fitting 30 is not likely to be removed after being mounted.

The form of the spring portion is not particularly limited also. Any configuration may be adopted as long as the spring portion is engaged with the inner wall surface portion of the fixation frame 10 (frame) and the switch pedestal 20 can be biased in a direction in which the switch pedestal 20 is pulled into the inside of the fixation frame 10.

[Modification Example of Method of Retaining Fixation Metal Fitting]

In the above-described embodiments, the pair of protruding portions 32A provided at the fixation metal fitting 30 (spring member) is fitted into the cyclic groove portion 14 (spring member fitting portion) provided on the inner peripheral surface (inner wall surface portion) of the fixation frame 10 (frame) such that the fixation metal fitting 30 is retained (locked). However, a configuration for retaining the fixation metal fitting 30 mounted onto the switch pedestal 20 (cover member) is not limited thereto. Any configuration may be adopted as long as the configuration is engaged with at least a portion of the fixation metal fitting 30 at the mounting position and movement in the detachment direction can be restricted.

[Regarding Devices to which Present Invention Is Applicable]

In the above-described embodiments, a case where the present invention is applied to a lens barrel of an interchangeable lens of an interchangeable lens camera has been described as an example. However, the application of the present invention is not limited thereto. The present invention can also be applied to a lens barrel of an integrated-lens camera. In addition, the present invention can also be applied to a lens barrel of an optical device (for example, microscopes, binoculars, telescopes, or like) other than cameras.

In addition, the present invention can also be applied to other than a lens barrel. In particular, the present invention works effectively for a device (electronic device or like comprising quadrangular and tubular exterior body) that comprises a tubular exterior body as at least a portion of an exterior housing constituting the exterior of the device.

EXPLANATION OF REFERENCES

1: lens barrel
2: mount
3: focus ring
4: zoom ring
5: stop ring
10: fixation frame
11: imaging distance range switching switch
12: OIS switch
13: opening portion
14: groove portion
20: switch pedestal
21: switch pedestal main body
22: fitted portion
23: fixation metal fitting mounting portion
24: flange portion
25: fixation metal fitting mounting shaft
25A: distal end surface of fixation metal fitting mounting shaft
25B: screw hole
26: fixation portion
26A: slit
27: screw
27A: screw portion of screw
27B: shaft portion of screw
27C: head portion of screw
28: claw portion
30: fixation metal fitting
31: main body portion of fixation metal fitting
32: spring portion of fixation metal fitting
32A: protruding portion
33: notch portion
34: elongated hole portion
34A: large-diameter portion
34B: small-diameter portion
40: packing
D1: mounting direction of fixation metal fitting
D2: detachment direction of fixation metal fitting

What is claimed is:

1. A lens barrel comprising:
a frame that has an opening portion;
a cover member that covers the opening portion;
a fitted portion that is provided on an inner surface side of the cover member, and is fitted into the opening portion to position the cover member with respect to the frame in a case where the opening portion is covered with the cover member;
a fixation portion that is provided on an inner surface side of the cover member and is disposed inside the frame through the opening portion in a case where the opening portion is covered with the cover member; and
a spring member that is engaged with the fixation portion and an inner wall surface portion of the frame and biases the cover member in a direction in which the cover member is pulled into an inside of the frame, wherein the spring member is formed of a leaf spring and has a main body portion mounted onto the fixation portion and a spring portion to be engaged with the inner wall surface portion of the frame,
the fixation portion has a slit into which a portion of the main body portion of the spring member is inserted, and
the spring member is mounted onto the fixation portion with the portion of the main body portion inserted into the slit.

2. The lens barrel according to claim 1,
wherein the opening portion is formed of a single opening.

3. The lens barrel according to claim 1,
wherein the frame has a spring member fitting portion that is provided at the inner wall surface portion and into which a portion of the spring portion of the spring member is fitted, and
the spring member is retained with the portion of the spring portion fitted into the spring member fitting portion.

4. The lens barrel according to claim 1,
wherein the fixation portion is provided at a distal end of a projecting portion having a columnar shape and has the slit in a direction orthogonal to a protruding direction of the projecting portion, and
the main body portion of the spring member has at least one of a notch or an elongated hole that is inserted into the slit.

5. The lens barrel according to claim 1,
wherein the cover member has an electronic circuit substrate on the inner surface side thereof, and
the spring member is attached to the cover member with the main body portion engaged with the fixation portion and the main body portion covers the electronic circuit substrate.

6. The lens barrel according to claim 5,
wherein the cover member has a switch member.

7. The lens barrel according to claim 6,
wherein the switch member is a slide switch.

8. The lens barrel according to claim 1,
wherein the frame has a cylindrical shape.

9. The lens barrel according to claim 1, further comprising:
packing that is mounted between the frame and the cover member.

10. The lens barrel according to claim 1,
wherein a plurality of the fixation portions are provided at the cover member.

11. The lens barrel according to claim 10,
wherein the fixation portions are disposed symmetrically with respect to a center or a center of gravity of the cover member.

12. The lens barrel according to claim 1, further comprising:
a claw portion that is provided at the cover member and is engaged with an edge of the opening portion of the frame.

13. An exterior housing comprising:
an exterior body that has an opening portion and has a tubular shape;
a cover member that covers the opening portion from an outside of the exterior body;
a fitted portion that is provided on an inner surface side of the cover member, and is fitted into the opening portion to position the cover member with respect to the exterior body in a case where the opening portion is covered with the cover member;

a fixation portion that is provided on an inner surface side of the cover member and is disposed inside the exterior body through the opening portion in a case where the opening portion is covered with the cover member; and a spring member that is engaged with the fixation portion and an inner wall surface portion of the exterior body and biases the cover member in a direction in which the cover member is pulled into an inside of the exterior body, wherein the spring member is formed of a leaf spring and has a main body portion mounted onto the fixation portion and a spring portion to be engaged with the inner wall surface portion of the exterior body, the fixation portion has a slit into which a portion of the main body portion of the spring member is inserted, and the spring member is mounted onto the fixation portion with the portion of the main body portion inserted into the slit.

* * * * *